Oct. 16, 1951  R. J. KUTZLER  2,571,260
AUTOMATIC PILOT
Filed Dec. 23, 1948
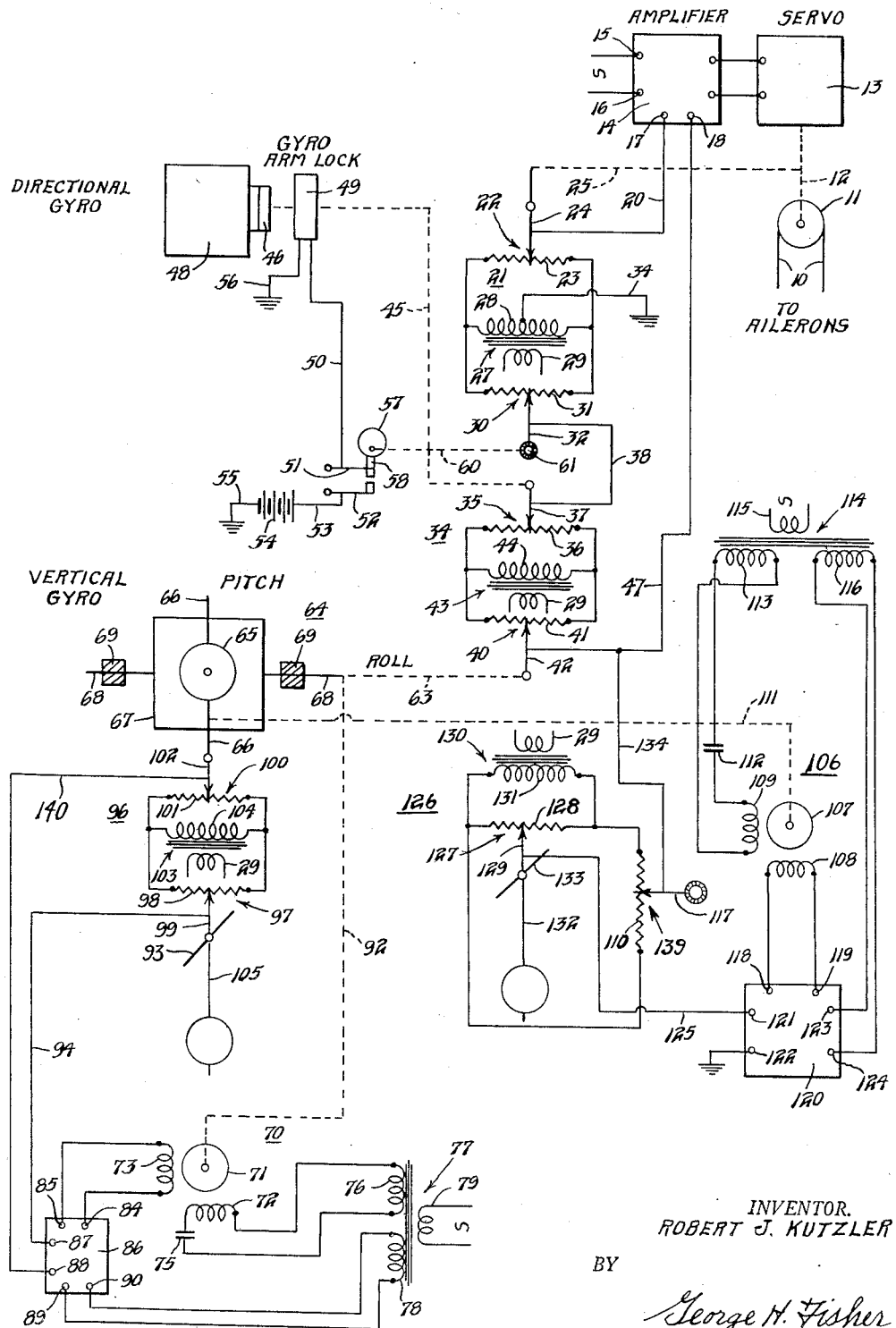
INVENTOR.
ROBERT J. KUTZLER
BY
George H. Fisher
ATTORNEY Patented Oct. 16, 1951

2,571,260

UNITED STATES PATENT OFFICE 2,571,260

AUTOMATIC PILOT

Robert J. Kutzler, Minneapolis, Minn., assignor to Minneapolis-Honeywell Regulator Company, Minneapolis, Minn., a corporation of Delaware Application December 23, 1948, Serial No. 67,036

20 Claims. (Cl. 244—77)

This invention pertains to automatic pilots for dirigible craft. Automatic pilots in many instances include a vertical gyroscope or flight gyro which stabilizes the craft about its roll and pitch axes. The rotor of such gyroscope rotates about an axis perpendicular to the earth. Should the rotor tend to drift from this perpendicular position, gravitational responsive means termed erecting means are generally provided to return the rotor to the perpendicular position.

When an aircraft is in a banked turn the gravitational responsive means tends to erect the gyroscope rotor to the apparent vertical rather than the true vertical to the earth. For this reason, in known erecting systems the erecting means for the gyroscope about one axis is rendered inoperative during banked turns of the aircraft. Since the gyroscope rotor may drift from the true vertical during the time the craft is in the banked turn, errors in the indication of the true vertical or in the apparent attitude of the aircraft will develop.

To avoid such errors, it is an object of this invention to provide an improved erecting means for a vertical gyroscope that may function continuously.

It is a further object of this invention to provide an erecting means for erecting the rotor of a gyroscope about the roll axis of an aircraft which operates continuously even if the aircraft is in a banked turn.

It is a further object of this invention to control the erection of a gyroscope rotor by gravitational responsive means with additional means for compensating for errors in said erection which would result from forces acting on said gravitational responsive means during banked turns of the craft.

It is a further object of this invention to effect such compensation automatically either while the craft is automatically stabilized on a given heading or when manual changes in heading by banked turns is effected.

It is a further object of this invention to provide an erecting means for a gyroscope which erecting means is controlled by a gravitational responsive device and a follow up device driven by said gyroscope.

It is a further object of this invention to erect a gyroscope from apparatus controlled by means responsive to gravity, by means responsive to the position of said gyro, and by manually operable means.

It is a further object of this invention to provide an automatic pilot for an aircraft including a vertical gyroscope wherein means for controlling the heading of the aircraft are utilized also for controlling the position of the rotor of said gyroscope.

These and further objects of the invention will become evident upon consideration of the following description of the invention in conjunction with the accompanying drawing showing a preferred embodiment thereof.

The drawing is a schematic illustration of my invention showing the components thereof and their association.

Referring to the drawing, there is illustrated only a portion of an automatic pilot for an aircraft. Such automatic pilot is provided with apparatus for controlling the aircraft about three axes. The portion illustrated in the drawing controls the aircraft about the longitudinal or roll axis of the aircraft. Control of the aircraft about the roll axis is obtained by the operation of the ailerons. Such ailerons are not shown but are operated by cables 10 extending from cable drum 11 carried by a servomotor shaft 12. The shaft 12 is driven by servomotor 13 which in turn is controlled by an amplifier 14. The servomotor-amplifier combination reversibly controls the rotation of the servomotor depending on the phase relationship between a control voltage signal and power voltage applied to the amplifier and may be of the type disclosed in the application of Willis H. Gille, S. N. 447,989 or in Patent 2,425,734 to W. H. Gille et al.

The amplifier 14 is provided with terminals 15 and 16 which are connected to a source of alternating voltage which may be the ship's supply or an inverter not shown. Amplifier 14 includes signal voltage input terminals 17 and 18. The direction of rotation of servomotor 13 depends upon the phase relationship between the voltage across terminals 15, 16 with respect to the voltage across signal input terminals 17, 18.

The amplifier signal input terminals are connected to a control circuit which extends from terminals 17, lead 20, network 21, lead 38, network 34, lead 47, to the other amplifier terminal 18. If desired, for reasons which will become apparent, the input terminals 17 and 18 may be connected to the control circuit through an isolating transformer with one end of the secondary connected to ground to avoid a free cathode.

The impedance network 21 consists of a servo balance potentiometer 22, a turn control potentiometer 30, and a transformer 27. Potentiometer 22 includes a resistor 23 which is connected across a secondary winding 28 of transformer 27, and an adjustable slider 24 operable over the resistor 23 and driven by a follow up connection 25 extending from the servomotor shaft 12. The potentiometer 30 includes a resistor 31 connected across the secondary winding 28 in parallel with resistor 23 and a manually adjustable slider 32. The transformer 27 includes a primary winding 29 which may be energized from the ship's supply. The secondary winding 28 has a center tap connected by lead 34 to ground for a purpose later to become apparent. Lead 20 extends from amplifier terminal 17 to the slider 24 of the servo balance potentiometer.

Impedance network 34 consists of a directional gyro aileron potentiometer 35, a vertical gyro banking potentiometer 40, and a transformer 43. Potentiometer 35 includes a resistor 36 which is connected across a secondary winding 44 of transformer 43 and an adjustable slider 37. The potentiometer 40 includes a resistor 41 which is connected across the secondary winding 47 in parallel with resistor 36 and an adjustable slider 42. Transformer 43 includes a primary winding. Since in the several networks mentioned the secondary windings may have a common primary winding, the primary winding of transformer 43 is also indicated by the reference character 29. A lead 38 extends from slider 37 to slider 32 of the turn control potentiometer 30. A lead 47 extends from the slider 42 to the amplifier input terminal 18.

It is evident that the networks 21 and 34 are separately in the form of a Wheatstone bridge. The output members of each bridge consist of the sliders of each bridge which engage the opposing resistors. In normal position these sliders are at the electrical centers of their resistors at which time there is no voltage output from either bridge. It is further evident that as connected the networks 21 and 34 represent a plurality of sources of voltages connected in series relation to the amplifier 14. These voltages may be varied in phase and in magnitude depending upon the adjustment of the sliders.

The means for operating the sliders of network 34 will be stated. The slider 37 of potentiometer 35 is provided with adjusting means consisting of the operative connection 45, extending through a directional gyro arm lock 49 and a slip clutch 46 of conventional design connected to the output member, not shown, of a directional gyro 48. The directional gyro 48 is of the horizontal type responding to changes in azimuth and may be of the type disclosed in the aforesaid application Ser. No. 447,989. In such type of directional gyro, movement of the aircraft about the vertical axis of the aircraft is sensed by the directional gyro which through the aforesaid adjusting means causes the slider 37 to move with respect to resistor 36 in magnitude and in a direction in proportion to the direction and magnitude of the deviation of the aircraft from a particular heading. The directional gyro 48 is provided with a directional arm lock 49 as in the aforesaid Gille application. The directional arm lock is energized by a circuit consisting of lead 50, movable contact bearing switch arm 51, fixed contact bearing arm 52, lead 53, battery 54, lead 55 to ground, and to grounded lead 56 of the directional arm lock 49. When the directional arm lock is energized, the operative connection 45 is held against movement and movement of the directional gyro 48 is permitted through the slip clutch 46.

The switch arms 51 and 52 in normal position have their respective contacts lightly spaced.

A follower 58 carried by the switch arm 51 is operated on rotation of an eccentric 57 to cause the engagement of the contacts of switch arms 51 and 52. The eccentric 57 is carried by a shaft 60 extending from the manual turn control knob 61 which additionally operates the slider 32 of potentiometer 30. The turn control knob 61 may also operate a potentiometer slider in the rudder channel as in the aforesaid Gille application.

The slider 42 of the potentiometer 40 is operated by a vertical gyro 64 upon movement of a craft about the roll axis by means to be described. The vertical gyroscope 64 includes a rotor bearing casing 65 which rotatably supports a rotor not shown. The casing 65 has trunnions 66 supported in a gimbal ring 67. The gimbal ring in turn has trunnions 68, 68 carried in bearing 69, 69 fixed to the craft. The axes of the rotor in casing 65, trunnions 66, 66, and trunnions 69, 69 are mutually perpendicular. It is thus seen that the rotor in casing 65 has angular freedom about three axes comprising one vertical axis and two horizontal axes. The vertical gyro 64 has an operative connection 63 extending from one trunnion 68 to the slider 42. The vertical gyro 64 is so arranged in the aircraft that upon tilt of the aircraft about the roll axis the slider 42 is adjusted with respect to resistor 41 in direction and in proportion to the direction and magnitude of the tilt of the aircraft about the roll axis. The gyro 64 also as is well known operates a slider at a potentiometer in the rudder channel.

In order to control the position of the rotor in casing 65 of vertical gyro 64 with respect to the axis of trunnions 66 or the axis of trunnions 68, the gyro is provided with precessing motors 70, 106. These precessing motors are reversible two phase torque motors and may be of the type disclosed in the application of John F. Schoeppel, Serial No. 17,698.

The precessing motor 70 is a capacitor type induction motor and consists of a rotor 71 and stator field windings 72 and 73. The rotor 71 is inductively associated with the windings 72 and 73. Winding 72 is connected in series with a capacitor 75 across a secondary winding 76 of a transformer 77. Winding 72 is thus designated the line winding. The phase winding 73 of motor 70 is connected across output terminals 84, 85 of an amplifier 86. The amplifier 86 is provided with signal input terminals 87, 88 and also has power input terminals 89, 90 which are connected across a secondary winding 78 of transformer 77. The transformer 77 has a primary winding which is connected to the ship's supply or the inverter. The direction in which the motor windings tend to turn the rotor 71 depends upon the phase relationship between the voltage across the terminals 84, 85 of amplifier 86 and that across the secondary winding 76. The phase of the voltage across terminals 84, 85 depends upon the phase relationship between the voltage across the signal input terminals 87, 88 and that across the power input terminals 89, 90.

The association between the amplifier 86 and the precession motor 70 is not new, such combination being old in the art as shown in the patent to Taylor, 2,388,350. The rotor 71 has an operating connection extending to trunnion 68 of gyro 64 whereby when a torque is applied to the rotor 71 tending to turn the same, such torque in turn is applied to the trunnion 68. The torque being applied to the trunnion 68 causes the rotor incasing 65 to precess about the axis of trunnions 66, 66.

The signal applied to input terminals 87, 88 of amplifier 86 are obtained from a control circuit extending from terminal 87, lead 94, network 96, lead 140, to the opposite amplifier terminal 88. The impedance network 96 consists of a pendulum pitch axis potentiometer 97, a vertical gyro pitch axis potentiometer 100, and a transformer 103. Potentiometer 97 includes a resistor 98 which is connected across a secondary winding 104 of transformer 103. Potentiometer 97 includes a slider 99 which is adjusted by a pendulum 105 supported on an axis 93 which is parallel to the pitch axis of the aircraft. Potentiometer 100 includes a resistor 101 which is connected across the secondary winding 104 in parallel to resistor 98. Potentiometer 100 includes a slider 102 which is connected to trunnion 66 as is operated thereby upon movement of the craft about the pitch axis. The transformer 103 includes a primary winding 29 connected to the ship's supply. Although potentiometers 97 and 100 are illustrated as in proximity, they may be remotely located on the craft so that the pendulum is remote from the gyro.

As stated previously precession of the gyro rotor about the axis of trunnions 68, 68 of the vertical gryoscope is controlled by a precession motor 106. The precession motor 106 is similar to the precession motor 70. The motor 106 comprises a rotor 107 and stator windings 108, 109. The rotor 107 is mechanically associated with the trunnion 66 by any suitable operative connection 111. The stator windings 108, 109 are to be carried by the gimbal 67 in a manner disclosed in the aforesaid application of Schoeppel et al. The stator winding 109 is connected in series with a condenser 112 across a secondary winding 113 of a transformer 114. Transformer 114 includes a primary winding 115 and an additional secondary winding 116 for a purpose to be described. The stator winding 108 of the motor 106 is connected across output terminals 118, 119 of an amplifier 120. The amplifier 120 includes signal input terminals 121, 122 and power input terminals 123, 124. The power input terminals 123, 124 are connected to the respective ends of secondary winding 116 of transformer 114. The signal input terminals 121, 122 of amplifier 120 are connected to a signal voltage control circuit extending from terminal 121, lead 125, impedance network 126, lead 134, impedance network 34, lead 38, impedance network 21, lead 34, to ground and to the grounded terminal 122 of amplifier 120. The impedance network 126 consists of a pendulum roll axis potentiometer 127 having a resistor 128 and an adjustable slider 129; a transformer 130 having a primary winding 29 and a secondary winding 131, and a manually operable potentiometer 139 comprising a resistor 110 and a slider 117. Slider 129 is adjusted by a pendulum 132 which is pivoted about an axis 133 parallel to the roll axis of the aircraft. A lead 125 extends from terminal 121 of amplifier 120 to slider 129. Resistor 128 is connected across the secondary winding 131. Resistor 110 is connected across secondary winding 131 in parallel with resistor 128. Slider 117 is manually adjustable and lead 134 extends from slider 117 to slider 42 of potentiometer 40. The remaining control potentiometers of the input circuit have been described in connection with the input circuit of amplifier 14.

*Operation*

Assume that the aircraft is manually controlled and the autopilot is disengaged from the control surfaces as provided in application Ser. No. 447,989. Assume further that the aircraft is in a level position with respect to its roll and pitch axes. The operation of the vertical gyro rotor precession motors and their control elements may be considered at this time.

With respect to motor 70, the control elements are the potentiometer 97 and the potentiometer 100. Potentiometer 97 is controlled by the pendulum 105 which is a gravitationally responsive element. The pendulum 105 tends to align itself with the direction of gravity in the well known manner. If the axis of the rotor is not aligned about the axis of trunnion 66 with the direction of gravity the sliders 99 and 102 will have a relative displacement on their resistors 98 and 101. A signal voltage will thus be obtained between wipers 102 and 99 which is applied to amplifier 86. The amplifier 86 operates and causes the motor 70 to apply a torque to gimbal 67 about the axis of trunnions 68, 68. The rotor will precess about the axis of trunnions 66, 66 until the slider 102 has the corresponding position as the slider 99 at which time there will be no voltage across the sliders and the amplifier 86 will no longer operate.

It is apparent that the voltage across the sliders 99, 102 varies with the magnitude in deviation of the direction of the vertical gyro rotor axis from the position of the gravitational responsive pendulum 105 and therefore the torque applied by the motor 70 to precess the gyro about axis of trunnions 66, 66 varies with the magnitude of the deviation. As the difference between the gyro rotor axis position and the pendulum position decreases the amount of signal between wipers 99 and 102 decreases and the torque being applied by the motor 70 to the trunnion 68 decreases. Thus as the gyro rotor axis approaches the desired position with respect to the axes of trunnions 66, 66 the amount of precessing torque decreases likewise, thereby providing smooth erection to the vertical of the gyro rotor.

With respect to the operation of the precession motor of the gyro rotor about axis of trunnions 68, 68, it is considered that the sliders 117, 32, 37, are at the electrical centers of their respective resistors 110, 31, and 36. At this time the amplifier 120 is controlled automatically by the pendulum operated potentiometer 127 and the vertical gyro bank potentiometer 40. If the axis of the rotor of the vertical gyro 64 be not aligned with the pendulum 132 about the axis of trunnions 68, 68, the slider 42 and the slider 129 will be relatively displaced along their resistors 41, 128. A difference of potential will be produced across the sliders 129 and 42 which is applied to the amplifier 120. The amplifier 120 energizes the precession motor 106 which applies a torque to the trunnion 66. The gyro rotor precesses about the axis of trunnions 68, 68 until the slider 42 is at the position corresponding to the position of slider 129. At this time there will be no signal voltage across the sliders 42, 129 and the amplifier 120 will no longer operate. Since the pendulum 132 is acted upon by gravity to align itself in the direction of gravity about the axis 133 which is parallel to the roll axis of the aircraft, it is apparent that the gyro rotor axis is aligned in the direction of gravity with respect to the axis of trunnions 68, 68. It is therefore evident that the gyro rotor is aligned about the axis of trunnions 66, 66 by the pendulum 105 and is aligned about the axis of trunnions 68, 68 by the pendulum 132. The gyro is therefore aligned with the direction of gravity about two perpendicular axes and is therefore aligned with the perpendicular to the earth's surface and is thus in a vertical position. The pendulums 105 and 132 tend to maintain the alignment of the gyro rotor axis with the direction of gravity.

We may now assume that the aircraft is to be automatically stabilized on a given heading by the automatic pilot. Stabilization on a given heading is provided by the directonal gyro 48 which operates the slider 37. In order for the operation of slider 37 stated to occur the turn control knob 61 must be in normal position where slider 32 is at the mid point of resistor 31 when the contact arms 51, 52 are in open position. At the time stabilization is initiated, the aircraft is in level position as stated and the vertical gyro rotor is in erect position consequently the sliders 42, 37, 32, and 24 are at the electrical centers of their respective resistors. At this time there is no signal voltage applied to the input circuit of the aileron amplifier 14.

Should the aircraft change its heading toward the left from the desired or stabilized heading the directional gyro 48 will move the slider 37 of the directional gyro aileron potentiometer 35 toward the left. The directional gyro also in a well known manner provides a signal in the rudder control channel of the automatic pilot for example as disclosed in the aforesaid Gille application. The control circuit to aileron amplifier 14 is now unbalanced and the servomotor 13 operates to position the left aileron in a downward direction and the right aileron in an upward direction. The aircraft banks toward the right under the applied ailerons. As the servomotor 13 positions the ailerons through the cables 10, it also through the operative connection 25 positions the slider 24 to balance the input circuit to aileron amplifier 14.

The vertical gyro 64 in response to the banking of the aircraft adjusts the slider 42 of the banking potentiometer 40. The bank angle of the aircraft increases as long as the ailerons are displaced from normal position, and the slider 42 is positioned until the amplifier 14 responding to the opposite phase signal in its control circuit operates in the reverse direction causing the servomotor 13 to move the ailerons back to normal or streamline position. The servomotor 12 also moves the slider 24 of the follow up potentiometer 22 back to its electrical center. The aircraft in the attitude of its right bank turns and tends to decrease the deviation incurred toward the left.

If the aircraft is in a coordinated turn toward the right, the aircraft is neither skidding or slipping. At this time the direction of apparent gravity is perpendicular to the floor of the aircraft. The pendulum 132 tends to align itself with the direction of apparent gravity due to the effect of gravity and the centrifugal force resulting from the turn in which the aircraft is pursuing. The pendulum 132 is therefore at the electrical center of resistor 128 which is carried by the aircraft. The slider 42 of the banking potentiometer 40 however is displaced from the electrical center of resistor 41 in proportion to the amount of bank of the aircraft. It is therefore evident that if the precession motor 106 for erecting the gyro rotor about the axis of trunnions 68, 68 were at this time controlled solely by the pendulum operated potentiometer 127 and the gyro bank potentiometer 40 that the gyro rotor would be erected to a false vertical position. However, the directional gyro 48 has operated the slider 37 to provide a signal which initiated the bank of the aircraft and is therefore proportional to the bank of the aircraft. The sliders 42 and 37 are therefore in corresponding positions along their resistors so that there is no potential difference between sliders 37 and 42. Since the slider 129 is at the center of resistor 128 as stated there is no control signal applied to the erection motor amplifier 120.

As the aircraft moves toward the desired or stabilized heading the directional gyro signal decreases and the slider 37 of the directional gyro potentiometer 35 is moved toward the right or toward the electrical center of resistor 36. The input circuit of the aileron amplifier 14 is now unbalanced in the opposite direction from that of initial unbalance. The amplifier 14 operates the aileron servomotor 13 to move the ailerons in the opposite directions. At this time, the left aileron is moved in an upward direction and the right aileron is moved in a downward direction thereby tending to decrease the amount of right bank of the aircraft. In response to the decrease in the right bank of the aircraft, the vertical gyro 64 moves the slider 42 of the banking potentiometer toward the right from its left position causing the ailerons to be again moved to their center positions. The action is continuous in that as the aircraft approaches its heading the amount of bank of the aircraft is decreased until the craft is substantially in level position when it has attained its desired heading.

At this time as the aircraft approaches its desired heading, the signal from the banking potentiometer 40 and the directional gyro potentiometer 35 continually balance one another with respect to the roll axis erection motor 106. Should there be any tendency for a voltage to be developed across the sliders 37 and 42 of potentiometers 35 and 40 which would be applied to the erection motor amplifier 120 this voltage would also be applied to the aileron amplifier 14. The effect of this voltage signal on amplifier 14 is to cause the aircraft to assume an attitude wherein the wipers 37 and 42 assume corresponding positions on their respective resistors before such potential can cause the erection motor amplifier 120 to cause the operation of precession motor 106. In other words the automatic pilot has a more rapid response than the gyro erection motor system.

It is apparent that if the aircraft deviates to the right the automatic pilot functions to place the aircraft in a left bank to return the aircraft to its desired heading with the aircraft ultimately placed in level flight position with the ailerons and rudder in normal position. During this time the directional gyro potentiometer 35 and the vertical gyro bank potentiometer 40 continually balance the input circuit to the precession motor 120 to maintain the vertical gyro in its proper position with respect to the roll axis while the pendulum operated slider 129 assumes a position along resistor 128 corresponding to that of apparent gravity.

If it be desired to manually change the heading of the aircraft through the automatic pilot, the manual control knob 61 may be operated in one or the other direction to effect the desired change in heading. During such manual changes in heading through the automatic pilot, the slider 32 operated by the manual turn control knob 61 functions in the same manner as the slider 37 which is operated by the directional gyro 48 during stabilized heading. The turn control knob through the adjustment of slider 32 provides a signal proportional to the bank signal obtained from potentiometer 40 with respect to the control circuit of the erection motor amplifier 120. When the aircraft approaches the desired heading, the turn control knob 61 is operated and moves slider 32 toward the center of resistor 31. The slider 32 therefore operates at this time in the manner which slider 37 operated during the decrease in the amount of deviation on stabilized heading.

With the automatic pilot disconnected from the control surfaces, it is apparent that by operating the slider 117 the input circuit of amplifier 120 will become unbalanced. If the aircraft is in a level position with respect to the roll and pitch axes, the slider 129 operated by pendulum 132 will be at the center of resistor 128. The amplifier 120 will operate the motor 106 causing the gyro to precess about the axis of trunnions 68, 68 until the signal provided by the adjustment of slider 42 balances a signal from the potentiometer 139. The position of the rotor of the gyro vertical is now altered with respect to the position of the pendulum 132 and the pendulum 132 will subsequently stabilize the gyro rotor in this adjusted position.

A potentiometer similar to potentiometer 139 could also be included in the input circuit of pitch erection amplifier 86 whereby the normal position of the vertical gyro rotor about the pitch axis could be varied.

It is now evident that there has been provided a novel automatic pilot which includes a vertical gyro having erecting means operable continuously for maintaining the rotor thereof in a vertical position, the position in which the rotor is to be maintained may be altered as desired but with the erection or precession system continuously operative.

It will be apparent to those skilled in the art from the above description that my invention may assume forms other than in the particular embodiment described. It is therefore desired that the invention be not limited to the particular arrangement described but only as defined by the following claims.

I claim as my invention:

1. Erection mechanism for a gyroscope comprising: means for precessing said gyroscope about an axis; control means for said precessing means; operating means for said control means comprising: a pick-off responsive to tilt of the gyroscope about an axis, a gravitational responsive means pick-off, and selectively operable pick-off means for changing the normal relative position of said first two pick-offs.

2. Erecting mechanism for a gyroscope mounted in a dirigible craft said mechanism comprising: power means for precessing the rotor of said gyroscope; control means for said power means comprising a balanceable circuit; means responsive to tilt of said gyroscope about one axis for affecting the balance of said circuit; gravitational responsive means for also affecting the balance of said circuit; and means adjusted in proportion to the movement of the craft about an axis for additionally affecting the balance of said circuit.

3. Control apparatus for an aircraft comprising: power means for controlling the attitude of the aircraft about its roll axis which attitude determines the rate of change in heading of the craft; control means for said power means; a balanceable circuit for operating said control means including means responsive to the magnitude of change in heading of said craft for initiating operation of said control means, means including a gyroscope responsive to the magnitude of tilt about said axis, and follow up means operated by said power means; said gyroscope having the position of its rotor controlled by means including motor operated erecting means controlled by the magnitude of response of said heading responsive means, the magnitude of response of said gyroscope means, and also the magnitude of response of a gravitational responsive means whereby, the tendency to erect said gyro rotor axis to the direction of apparent gravity as applied to said gravitational responsive means on banked turns of the craft is offset by said heading responsive means.

4. Erecting apparatus for a gyroscope rotor having three axes of rotation comprising: torque applying means adapted to apply torque about one of said axes; control means for said torque applying means; a balanceable electrical network for operating said control means, said network including a plurality of series connected variable signal producing devices; means responsive to tilt of the gyro for actuating one signal producing device to supply a signal whose magnitude is proportional to the tilt; and means responsive to gravity for actuating another signal producing device to provide a signal in proportion to the departure of said gravitational means from the direction of gravity whereby a resultant signal proportional to the difference of said tilt signal and said departure from gravity signal is derived from said network and through said control means controls said torque applying means.

5. Means for banking an aircraft in accordance with a preset value comprising: power means for controlling said aircraft about its bank axis; manually operable selecting means for operating said power means from normal position to place said aircraft in a bank; a gyro vertical means responsive to bank of the aircraft for causing return of said power means to normal position on attainment of said preset bank; and means for continuously erecting said gyroscope comprising: means operated by said selecting means, means operated by said gyroscope, and gravitational responsive means.

6. Stabilizing apparatus for a dirigible craft comprising: power means for controlling the attitude of the craft about an axis; a vertical gyroscope; a gravitational responsive device; two relatively remotely located pick-off means, one pick-off means being operated by said gyroscope and the other of said pick-offs being operated by said gravitational means; torque applying means for said gyroscope differentially controlled by said two pick-off means, and means for controlling said power means from said gyro pick-off means.

7. Control apparatus for a dirigible craft comprising: power means for controlling the attitude of said craft about an axis thereof; a vertical gyroscope; a balanceable circuit for controlling said power means, including a plurality of signal producing devices; means responsive to relative tilt of said gyroscope and craft for operating one device to unbalance said circuit; means driven by said power means for operating another device to rebalance said circuit; torque applying means for said gyroscope; and pendulum means responsive to tilt of the craft about said axis for providing a signal proportional to said tilt and connected to said torque applying means.

8. Apparatus for providing banked turns in a craft which are proportional to changes in heading of said craft comprising: means including a device responsive to change in heading for causing banking of said craft; means including a gyroscope responsive to bank of said craft for limiting the degree of bank; and erecting means for said gyroscope, said erecting means being controlled by said device responsive to changes in heading and by said gyroscope.

9. Apparatus for controlling a dirigible craft comprising: means responsive to change in heading of said craft about one axis; gyroscope means responsive to tilt of said craft about a second axis; rebalancing means; power means for controlling the attitude of said craft about said second axis; control means for said power means and operated by said heading means, said gyroscope means, and said follow-up means; and means for precessing said gyroscope including said heading means, said gyroscope means, and gravitational means carried by said craft and responsive to tilt thereof.

10. In an automatic pilot for controlling the angular position of an aircraft including a vertical gyroscope, in combination: gravitational elements carried by said craft; a first means responsive to relative tilt of said craft and gravitational elements; means for applying a torque to said gyroscope about an axis at right angles to the axis of tilt; a second means responsive to relative tilt of said craft and gyroscope; means for connecting said first and second responsive means with said torque means to differentially control it according to the relative tilt of said gravitational elements and said gyroscope; and means for controlling the attitude of the craft about said axis and operated by said second responsive means.

11. In a control apparatus for a vertical gyroscope rotor having three angular degrees of freedom; torque means for precessing said gyroscope rotor; control means for said torque means operated in accordance with a differential response signal; signal combining means connected to said control means; means for supplying signals to said combining means from which said differential response signal is obtained comprising gyroscope means responsive to tilt about one axis, gravitational responsive means, and manually operable means for changing the response positions of said gyroscope and gravitational means.

12. Apparatus for stabilizing an aircraft comprising: power means for controlling the attitude of the craft about an axis; a vertical gyroscope responsive to tilt about said axis; means controlled by said gyroscope for operating said power means; torque means for precessing said gyroscope; signal combining means for controlling said torque means and including signal producing devices; gravitational responsive means for operating a first device, an operating connection from said gyroscope to a second device whereby said torque means is responsive to a differential resultant signal between said devices; and manually operable means connected to a third device for altering the relative position of said first and second devices through said torque means at which a differential signal occurs.

13. In control apparatus for a vertical gyroscope rotor having three degrees of angular freedom; motor means for precessing said gyroscope rotor about an axis; means responsive to tilt of said gyroscope about said axis for providing a first signal in proportion to the tilt; gravitational responsive means for providing a second signal proportional to its departure from the direction of gravity; manual means for providing a third signal; and signal combining means connected to said motor means and to said signal providing means.

14. Control apparatus for a vertical gyroscope having a rotor with three angular degrees of freedom, said apparatus comprising: torque means for precessing said gyroscope; control means for said torque means including a balanceable electrical network having a plurality of signal producing devices connected in series relation; means for operating one device from said gyroscope in response to tilt thereof about one axis; means including a gravitational responsive member for operating a second device remote from said first device; and selective means for operating a third device, whereby the relative position of said first and second devices which relative position if changed normally automatically operates said torque means, may be altered.

15. Control apparatus for a vertical gyroscope having a rotor with three angular degrees of freedom; torque means for precessing said gyroscope rotor; gravitational responsive means; follow up means driven by said gyroscope; means responsive to changes in heading; and an electrical signal producing and combining means for operating said torque means and controlled by said gravitational, follow up, and heading change responsive means.

16. Control apparatus for an aircraft comprising: power means for positioning the aircraft about its roll axis; pick-off means responsive to change in heading of said craft for initiating operation of said power means from a normal position and movement of the craft about said axis; pick-off means including a vertical gyroscope responsive to tilt about said axis for operating said power means to return it to normal position; torque means for precessing said gyroscope; gravitational means for operating a pick-off means; means for differentially controlling said torque means from said vertical gyro and gravitational pick-off means, and means for compensating for the effect of centrifugal force on said gravitational pick-off as said change in heading is being reduced.

17. Control apparatus for an aircraft comprising: power means for controlling the angular position of said aircraft about an axis; means including a manually operable means for controlling said power means; a vertical gyroscope having three angular degrees of freedom; precessing means for said gyroscope; control means for said precessing means including gravitational responsive means, means controlled by said gyroscope, and said manually operable means, said manually operable means operating said control means to compensate said control means for the effect of movement about a second axis on said gravitational means.

18. In a vertical gyroscope having angular freedom about three axes; torque means for precessing said gyroscope, said torque means including a capacitor induction motor comprising a rotor carried on one axis of said gyroscope and a stator coacting therewith; a balanceable control means for said torque means and having two series connected, alternating current, variable impedance devices; means responsive to gravity for operating one device in accordance with its departure from a normal position; and follow up means driven by said gyroscope in response to tilt thereof for operating a second device.

19. Stabilizing apparatus for a dirigible craft comprising: power means for controlling the attitude of the craft about a horizontal axis; a vertical gyroscope responsive to tilt about said axis; a gravitational responsive device; erecting means for said vertical gyroscope controlled by said gravitational responsive device and by said gyroscope for causing erection of said gyroscope whenever the position of said gyroscope does not correspond with that of said gravitational responsive device; controlling means including said vertical gyroscope for controlling the attitude of said craft; course changing means for affecting said controlling means to cause a change in said attitude; and means operated by said course changing means for affecting the relative positions of said gyroscope and said gravitational device at which said erection means is effective in such a manner that said erection means is not rendered operable by such a change in attitude.

20. Control apparatus for an aircraft comprising: power means for controlling the attitude of the craft about its longitudinal axis; control means for said power means; a first balanceable circuit for operating said control means said circuit including a manually operable turn control means for unbalancing said circuit to cause the craft to bank and turn, means responsive to tilt about said bank axis including a gyroscope, and follow up means driven by said power means; motor operated erecting means for said gyroscope for changing the direction of its rotor axis; additional control means for said motor operated erecting means; and a second balanceable circuit for operating said additional control means, said second balanceable circuit including said manually operable means, said tilt responsive means, and a gravitational responsive means so positioned on said craft as to be affected by the bank attitude of said craft and lateral acceleration thereof, whereby the tendency to erect said gyro rotor axis to the direction of apparent gravity on banked turns of the craft from said tilt responsive and gravitational responsive means is offset by said manually operable means.

ROBERT J. KUTZLER.

REFERENCES CITED

The following references are of record in the file of this patent:

UNITED STATES PATENTS

| Number | Name | Date |
| --- | --- | --- |
| 1,942,470 | Bassett | Jan. 9, 1934 |
| 2,066,194 | Bates | Dec. 29, 1936 |
| 2,162,862 | Protzen | June 20, 1939 |
| 2,197,898 | Roland et al. | Apr. 23, 1940 |
| 2,278,379 | Koster | Mar. 31, 1942 |
| 2,382,993 | Haskins, Jr. | Aug. 21, 1945 |